May 14, 1968 — E. J. SCHNEIDER ET AL — 3,382,756

OPTICAL SCALE READING APPARATUS AND METHOD

Filed March 12, 1962

Eric J. Schneider
Berwyn T. Archer
INVENTORS

BY Kegan, Bellamy and Kegan
Attys

United States Patent Office 3,382,756
Patented May 14, 1968

3,382,756
OPTICAL SCALE READING APPARATUS AND METHOD
Eric J. Schneider and Berwyn T. Archer, Chicago, Ill., assignors to Engis Equipment Company, Chicago, Ill., a corporation of Illinois
Filed Mar. 12, 1962, Ser. No. 179,137
5 Claims. (Cl. 88—14)

This invention relates to an apparatus utilizing an oscillating movement as a control and having an oscillating graduated scale disc operatively connected thereto to denote the position of the oscillating movement. More particularly it refers to an improvement in such an apparatus comprising means for enabling the graduated scale to be rapidly and accurately read.

Many instruments utilize the principle of an oscillating movement to establish a frame of reference. The most common are those utilizing the principle of the Foucault pendulum. In this system a heavy pendulum is caused to oscillate. A graduated scale disc is operatively connected to the pendulum and oscillates in conformity thereto. The relative position of the instrument with respect to the instantaneous position of the pendulum is continually indicated by the graduated scale disc. In practice, readings are taken when the maximum amplitude of oscillation has occurred. Maximum amplitude readings are taken at both ends of the cycle and the prime reference point is then taken as one half the distance between the two maximum readings, subject, of course, to a conventional correction as for damping, if needed.

Since the reversal in direction of an oscillating body is instantaneous, it is extremely difficult to obtain an accurate reading of the graduation markings on the moving scale disc before the oscillating body, and consequently the oscillating scale disc, has once again accelerated in the opposite direction.

It is an object of the invention to provide a means for determining the position of an oscillating graduated scale disc at the two points of maximum oscillation amplitude.

It is a further object to provide an optical instrument for tracking the position of bodies moving in space wherein the orientation of the instrument is controlled by the Foucault pendulum principle, wherein the position of the pendulum is indicated by an oscillating graduated scale disc, and wherein means is provided for easily and accurately determining the scale readings at maximum amplitude of oscillation.

Other objects and advantages of the invention will become apparent from the description which follows and from the drawing, in which.

Figure 1:
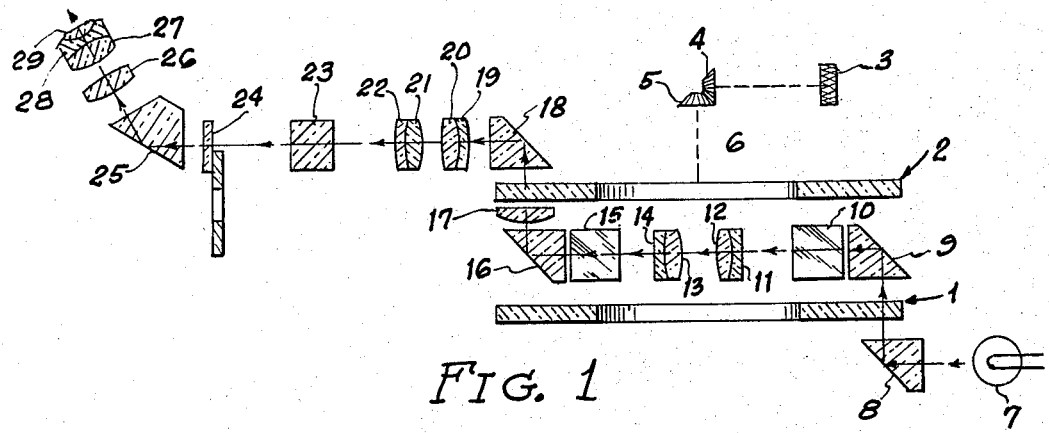
FIG. 1 is a schematic side elevational view of the optical system of the invention.

Although the present invention may be used in a variety of applications, the embodiment shown in the drawing is designed to be used with a theodolite having its orientation controlled by Foucault pendulum action.

Figure 2:
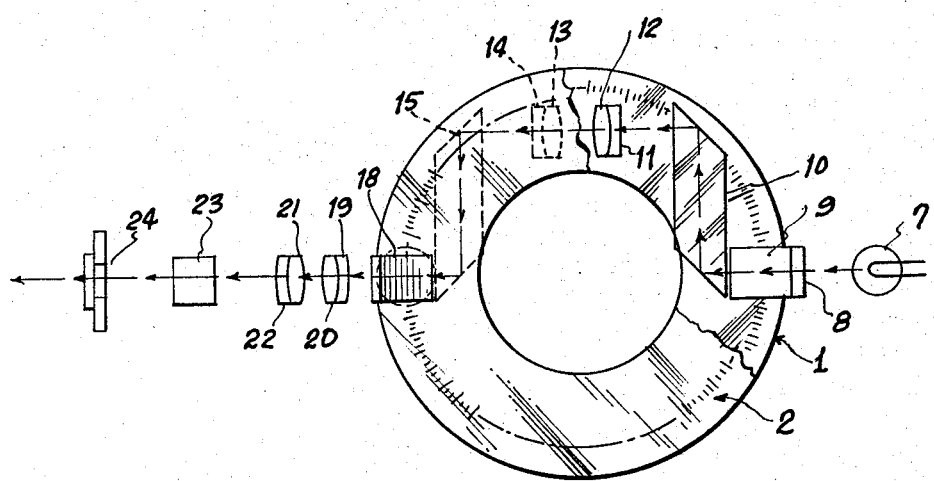
FIG. 2 is a schematic plan view of the apparatus shown in FIG. 1.

With reference to the drawing, the optical system is shown in FIGS. 1 and 2 and comprises the following structure. A transparent oscillating disc 1 having a graduated scale engraved thereon is mounted in the apparatus about a central axis perpendicular to its surface, and is operatively connected to a Foucault pendulum (not shown) and so arranged that it oscillates about its axis in conformity with the movement of the pendulum. Spaced coaxially above the oscillating disc is a transparent tracking disc 2 having a graduated scale engraved thereon substantially identical with that of the oscillating disc 1. The tracking disc 2 is rotatable independently of the movement of the oscillating disc 1. The tracking disc 2 may be rotated manually by means of knob 3 operating through a bevelled gear set 4 and 5 and a shaft 6 which is affixed to the tracking disc.

Light for the formation of optical images of the graduated scales of the discs 1 and 2 is provided by a lamp 7. The beam of light from the lamp 7 is first reflected vertically by a prism 8 through a segment of the scale of the disc 1, and then reflected horizontally by the prism 9. A double prism 10 directs the beam laterally to clear the axial portion of the disc mounting, and then redirects it in a forward direction. After convergence of the beam by the set of lenses 11, 12, 13, and 14, the beam is again returned in alignment with its original direction by a second double prism 15. The beam is then redirected vertically by the prism 16, passing through the lens 17 and through the graduated portion of the tracking disc 2. The beam, now containing images of segments of both scales, is again reflected laterally by the prism 18, through the lens set 19, 20, 21, 22, 23 and through an aperture 24. The beam is then reflected by the prism 25 into the finder or viewer comprised of the lenses 26, 27, 28 and 29.

Figure 3:
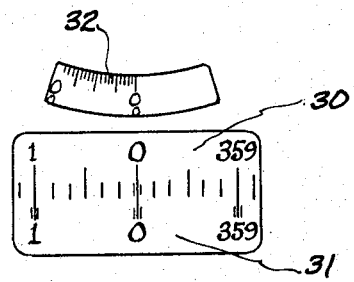
FIG. 3 is an image view of the scales of the invention as viewed in the finder of the apparatus.

In FIG. 3 are shown the images of the two scales as they appear in the finder. The upper image 30 is an image of a segment of the oscillating disc 1 while the lower image 31 is an image of a segment of the tracking disc. A separate scale 32, shown above the main scales, is a conventional micrometer system for obtaining precise readings.

In operation, the oscillation of the disc 1 is controlled by a Foucault pendulum. Alternatively a gyroscopically stabilized pendulum or any other device having a visually followable amplitude may be used. As the Foucault pendulum oscillates, the disc 1 also oscillates. To obtain a precise reading of the position of the oscillating disc at the point of maximum amplitude or deviation, the tracking disc 2 is rotated by manually turning the knob 3 until the two scales 30 and 31 are in exact alignment as the oscillating disc approaches its point of maximum deviation. Alignment is maintained continually by manually turning the knob 3 while the images of the two discs are observed in the viewer. When the oscillating disc 1 reaches its maximum amplitude position and stops, the tracking disc 2 is manually frozen in place while the oscillating disc reverses to complete its oscillation cycle. A reading may now be taken at leisure of the stationary tracking disc 2, which corresponds precisely to the position of maximum deflection of the oscillating disc. Since the reading of the stationary tracking disc 1 may be done at leisure, it is not necessary for the operator to rely upon his instantaneous judgment as to exactly when and where the maximum amplitude of rotation of the oscillating disc has occurred. The same procedure is then repeated by manually rotating the tracking disc 2 and keeping the two discs in perfect alignment until the other point of maximum deflection is reached. The tracking disc 2 is once again frozen and a reading taken at leisure.

Although the invention and its operation have been described in terms of a manual means for rotating the tracking disc 2, other means such as various automated forms may be utilized to enable the tracking disc to perform its tracking and stationary reading functions automatically.

In one embodiment the invention may be utilized with a Foucault pendulum in order to determine the direction in a missile. For example, the two maximum points of swing amplitude are determined by means of the tracking disc 2. When readings for the two maximum positions have been obtained, the point equal to one-half the distance between the two maximum readings constitutes the essential measurement from which the true north direction may be determined. Thus the system is adaptable for use in a missile in order to determine a given direction, as for example, north, without reference to any external object such as a given celestial body.

The graduated scales on the two discs are arbitrary. As shown in FIG. 3, the discs may be subdivided into 360 major divisions, or alternatively 6400 divisions of the circle surfaces may be utilized.

The two discs 1 and 2 should preferably be made of a transparent material such as glass so that images of the graduated scales may be obtained by means of transmitted light. The scales should preferably be identical so that images of equal size may be projected in the finder without the necessity for additional magnification of one image.

Although the invention has been described and shown in the drawing in terms of only a single embodiment, no undue limitation is to be inferred from that fact, and other embodiments which may suggest themselves to those skilled in the art are to be considered as falling within the scope of the invention as defined by the appended claims.

We claim:

1. In an apparatus comprising an oscillating controlling means operatively connected to an oscillating disc having a graduated scale thereon, the improvement which comprises:
   (A) a tracking disc having a graduated scale thereon substantially identical to that of said oscillating disc rotatively mounted at its central axis, said tracking disc being rotatable independently of movement of said oscillating disc,
   (B) means for rotating said tracking disc for annular displacement with respect to said oscillating disc for orienting said graduated scale of said tracking disc to conform with selected positions of said graduated scale of said oscillating disc,
   (C) optical viewing means, and
   (D) optical means for projecting two aligned images consisting of an image of a segment of said oscillating disc and an image of a segment of said tracking disc into said viewing means, said aligned images being disposed so that corresponding graduated markings on corresponding segments of said discs are scaled in the same direction and said corresponding markings appear to increase and decrease in the same direction;
      whereby said tracking disc may be rotated to maintain said scale images in said viewing means in alignment until said oscillating disc reaches the point of maximum deflection and begins to reverse, whereupon rotation of said tracking disc is terminated and its reading in said viewing means corresponding to the reading of said oscillating disc at the point of maximum deflection is determined at leisure.

2. An apparatus according to claim 1 wherein both said oscillating disc and said tracking disc are transparent.

3. In an optical instrument for determining the position of a body in space comprising a Foucault pendulum movement for providing orientation of said instrument operatively connected to a transparent oscillating disc having a graduated scale thereon, the improvement which comprises:
   (A) a transparent tracking disc rotatively mounted at its central axis, said tracking disc being rotatable independently of movement of said oscillating disc and having a graduated scale thereon substantially identical to that of said oscillating disc,
   (B) means for rotating said tracking disc for annular displacement with respect to said oscillating disc for orienting said graduated scale of said tracking disc to conform with selected positions of said graduated scale of said oscillating disc,
   (C) optical viewing means, and
   (D) optical means for projecting two aligned images consisting of an image of a segment of said oscillating disc and an image of a segment of said tracking disc into said viewing means, said aligned images being disposed so that corresponding graduated markings on corresponding segments of said discs are scales in the same direction and said corresponding markings appear to increase and decrease in the same direction;
      whereby said tracking disc may be rotated to maintain said scale images in said viewing means in alignment until said oscillating disc reaches the point of maximum deflection and begins to reverse, whereupon rotation of said tracking disc is terminated and its reading in said viewing means corresponding to the reading of said oscillating disc at the point of maximum deflection is determined at leisure.

4. An optical instrument according to claim 3 wherein said oscillating disc and said tracking disc are coaxially mounted and the segments of the scales of said oscillating disc and tracking disc which are viewed in said viewing means are oriented 180° from each other.

5. The method of optically determining the center of oscillation of an oscillating member comprising:
   projecting an image of said oscillating member onto a movable tracking means;
   manually moving said tracking means having measurable indicia thereon in such manner as to follow a first specific known point on said oscillating member;
   stopping said following of said first known specific point at one extreme limit of the oscillatory motion;
   optically measuring the position of said now stationary tracking means relative to a fixed point, thereby determining the relative position of said first known specific point on said oscillating member and said fixed point at one extreme limit of oscillation of said member;
   manually moving said tracking means in such manner as to follow a second known point on said oscillating member;
   stopping said following of said second known specific point at the other extreme limit of the oscillatory motion;
   optically measuring the position of said now stationary tracking means relative to the same fixed point, thereby determining the relative position of said second known specific point on said oscillating member and said fixed point at the other extreme limit of oscillation of said member;
   and then determining from the known positions of said first and second specific points on said oscillating member and their now determined positions at the two extreme limits of oscillation that third point on said oscillating member which is equidistant on opposite sides of said fixed point at the two extremes of oscillations, said third point being the center of oscillation of said member.

References Cited

UNITED STATES PATENTS

| 1,397,547 | 11/1921 | Reeves. | |
| 2,457,286 | 12/1948 | Tollefsen et al. | 116—129 |

FOREIGN PATENTS

| 482,262 | 3/1938 | Great Britain. |

DAVID H. RUBIN, *Primary Examiner.*

JEWELL H. PEDERSEN, JOHN K. CORBIN,
*Examiners.*